April 29, 1958 — A. F. BRENNAN — 2,832,862
COMBINATION SIGNAL-LIGHT SWITCH
Filed July 31, 1956 — 2 Sheets-Sheet 1
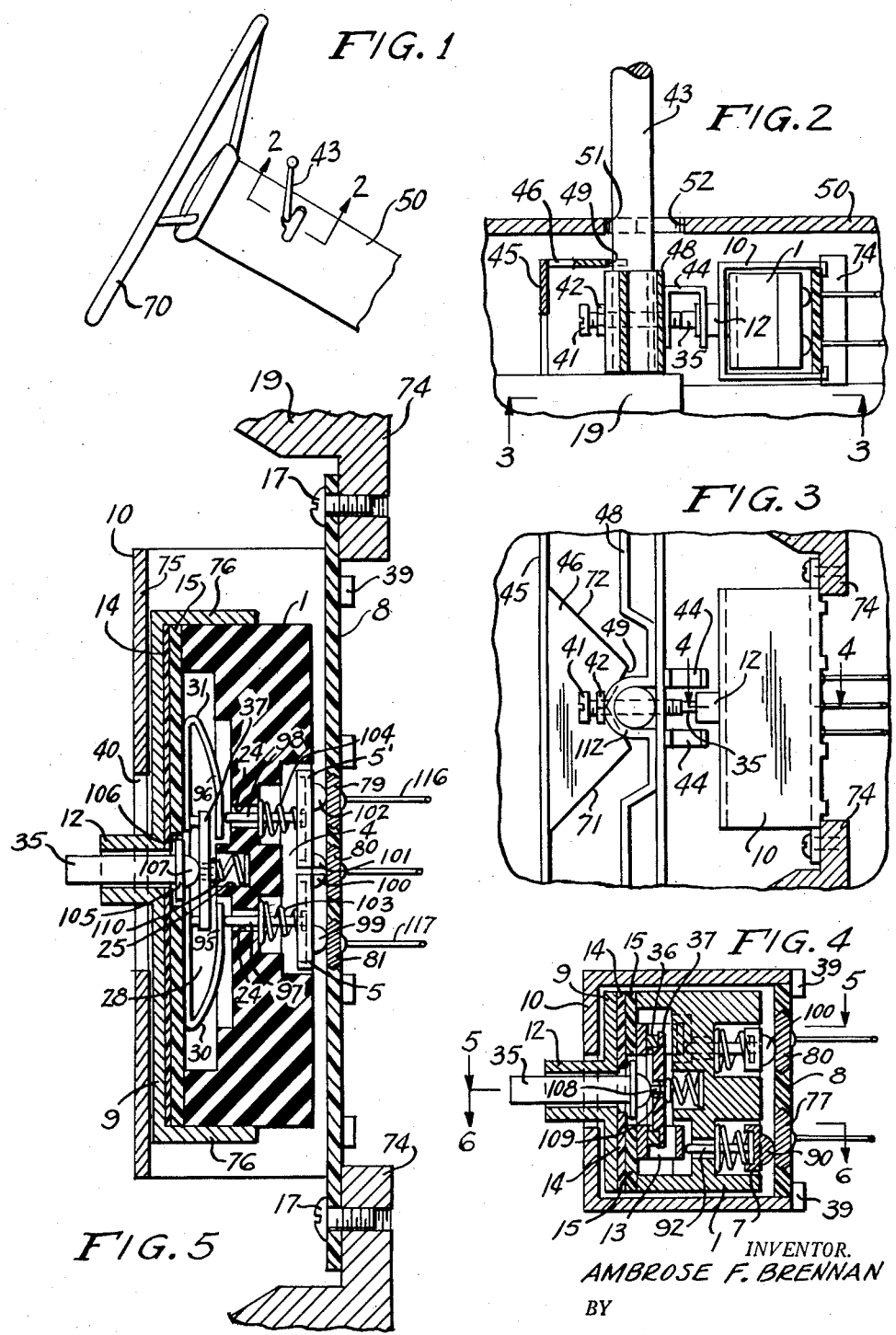
INVENTOR.
AMBROSE F. BRENNAN
BY
McMorrow, Berman & Davidson
ATTORNEYS April 29, 1958   A. F. BRENNAN   2,832,862
COMBINATION SIGNAL-LIGHT SWITCH
Filed July 31, 1956   2 Sheets-Sheet 2
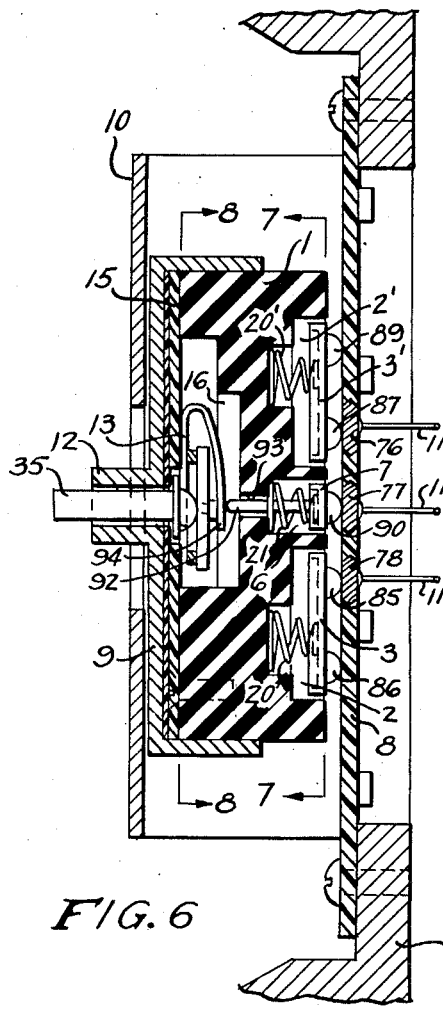
FIG. 6
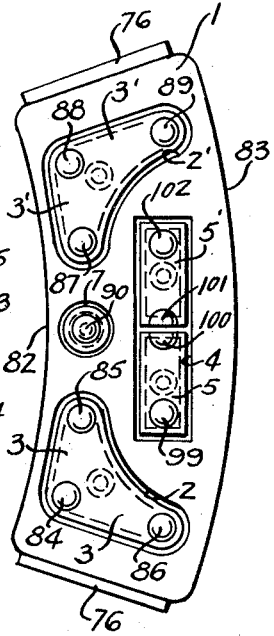
FIG. 7
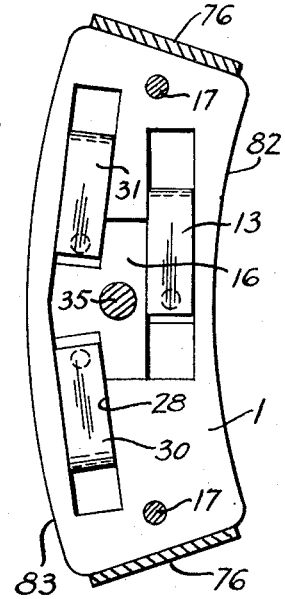
FIG. 8
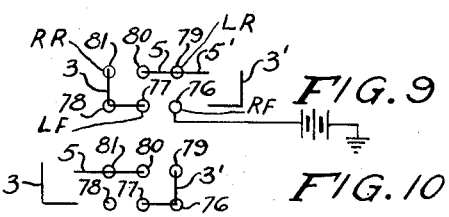
FIG. 9
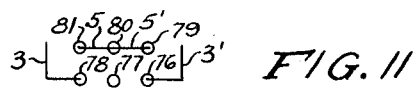
FIG. 10
FIG. 11
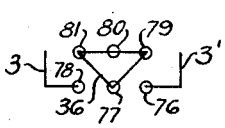
FIG. 12
INVENTOR.
AMBROSE F. BRENNAN
BY
McMorrow, Berman + Davidson
ATTORNEYS

United States Patent Office 2,832,862
Patented Apr. 29, 1958

2,832,862
COMBINATION SIGNAL-LIGHT SWITCH
Ambrose F. Brennan, Albany, N. Y.
Application July 31, 1956, Serial No. 601,203
5 Claims. (Cl. 200—61.54)

This invention relates to automobile directional signals, and more particularly to a combination turn light switch and warning signal switch assembly.

A main object of the invention is to provide a novel and improved combination turn light and warning signal switch assembly for use on automobiles, said assembly involving simple components, being easy to install, and being compact in size.

A further object of the invention is to provide an improved combination turn light and caution switch assembly for use on motor vehicles, said assembly involving inexpensive components, being durable in construction, being arranged so that it may be employed to actuate existing motor vehicle direction signals without the necessity of changing or adding to the motor vehicle wiring system, and providing a means of greatly reducing accident hazards, particularly the harzards of rear end motor vehicle collisions caused by deceleration of a vehicle without provision of adequate warning to a following vehicle.

A still further object of the invention is to provide an improved combination direction signal and warning signal switch assembly, said assembly being adapted for installation on motor vehicles without requiring any major modifications of the wiring of the vehicle on which it is installed, being arranged to serve as a manually operated caution light, and being readily accessible for operation by the driver of the vehicle on which it is installed, affording a substantial reduction in the hazards of rear end collisions caused by deceleration accompanying braking of the vehicle by providing an auxiliary signal means which may be employed in conjunction with the standard rear stop lights of the vehicle.

Further objects and advantages of the invention will become apparent from the following description and claims, and from the accompanying drawings, wherein:

Figure 1 is a side elevational view showing the upper portion of a steering post of a motor vehicle on which is installed a combination turn and warning switch constructed in accordance with the present invention.

Figure 2 is an enlarged fragmentary cross sectional view taken on the line 2—2 of Figure 1 in a substantially radial plane of the steering post.

Figure 3 is an elevational view taken on the line 3—3 of Figure 2.

Figure 4 is an enlarged cross sectional view taken on the line 4—4 of Figure 3.

Figure 5 is a cross sectional view taken on the line 5—5 of Figure 4.

Figure 6 is a cross sectional view similar to Figure 5 but taken on the line 6—6 of Figure 4.

Figure 7 is an elevational detail view taken on the line 7—7 of Figure 6.

Figure 8 is a cross sectional detail view taken on the line 8—8 of Figure 6.

Figures 9, 10, 11 and 12 are respective diagrams illustrating the electrical connections established by the switch device of Figures 1 to 8 in various positions of adjustment of the device.

Referring to the drawings, 50 designates the casing of a conventional steering post on which is mounted a combination direction signal and warning switch assembly according to the present invention, the column casing 50 being secured around the conventional steering column assembly shown fragmentarily in Figures 5 and 6 at 19. A column member 48 is slidably and rotatably mounted on the steering column assembly in a conventional manner and has secured thereto the direction signal control lever 43 which projects radially outward through a slot 52 formed in the housing 50. Slot 52 is formed at its intermediate portion at the edge thereof nearest the steering wheel 70 with an arcuate notch 51 adapted to receive the lever 43 in its caution light "on" position. Suitable spring means, not shown, acts on the positioning collar 45 to urge said collar to the right, as viewed in Figure 2, whereby lever 43 is biased toward notch 52 but may be moved manually to the left, as viewed in Figure 2. A positioning collar, shown at 45, is secured around the steering column assembly 19, said collar being formed with a symmetrically shaped lug 46, directed toward the lever 43, as shown in Figures 2 and 3 and being formed at its end with a V-shaped notch 49 adapted to receive the lever 43 in its centered position, as shown in Figure 3.

The member 45 is yieldable so that the lever 43 may be manually moved away from the notch 49 in either direction and may engage the inclined edge portions 71 and 72 of the lug 46 when the lever 43 is rotated to either of its direction-signalling positions.

The steering column assembly 19 is formed with a pair of spaced lugs 74, 74 located symmetrically on opposite sides of the radial plane containing the center of notch 49, and secured at its opposite ends to the lugs 74, 74 is a plate member 8 of insulating material, said plate member being fastened at its opposite marginal portions to the lugs 74 by respective fastening screws 17. Plate member 8 is generally rectangular in shape and secured thereon is a generally rectangular, sleeve-like housing 10, the opposite side walls of said housing being provided with the fastening lugs 39 which are crimped behind the supporting plate 8, as shown in Figures 4 and 5, the sides of the housing 10 engaging the side edges of plate member 8 with sufficient tightness to provide a rigid connection between housing 10 and said plate member 8.

Designated at 9 is an inner plate member slidably engaged in housing 10 adjacent the main wall 75 of said housing or the member 9 being centrally formed with a sleeve-like stud 12 which extends through a longitudinal slot 40 formed in the housing main wall 75, whereby the member 9 is longitudinally slidable and is guided by slot 40 in its longitudinal movement.

The opposite ends of the plate member 9 are formed with the respective flange elements 76, 76 between which is secured to generally rectangular block member 1 of insulating material. A centrally apertured insulating plate 15 is secured to the block member 1, and disposed between the insulating plate 15 and the plate member 9 is another centrally apertured insulating plate 14.

The block member 1 is formed at its surface adjacent the insulating plate member 8 with respective generally triangular recesses 2 and 2' in which are positioned the movable contact plates 3 and 3', said contact plates being also generally triangular but being slightly smaller than the recesses 2, 2', whereby the contact members 3 and 3' may be freely moved in a direction perpendicular to the insulating plate 8. Suitably secured in the insulating plate 8 flush therewith are two rows of three contacts each, the contacts being shown at 76, 77, 78 and at 79, 80 and 81. The contacts 76, 77 and 78, of which contacts 76 and 78 may be considered as "primary" contacts, are located adjacent one arcuate edge 82 of the block 1, whereas the contacts 79, 80 and 81, of which contacts 79 and 81 may be considered as "secondary" contacts, are located adjacent the opposite arcuate edge 83 of said block. The contact member 3 is formed with the respective contact projections 84, 85 and 86, the projections 84 and 85 being substantially aligned with and being at times engageable with the row of contacts 76, 77 and 78, the spacing between the lugs 84 and 85 being substantially the same as the spacing between the successive contacts 76, 77 and 78. The projection 86 is substantially aligned with and at time engageable with the remaining row of contacts 79, 80 and 81 of the insulating plate 8, as will be presently described. Similarly, the contact member 3' is formed with the contact projections 87, 88 and 89, the projections 88 and 87 being similar in spacing to projections 84 and 85 and being substantially aligned with the contacts 76, 77 and 78, whereas the projection 89 is substantially aligned with the contacts 79, 80 and 81 and is at times engageable with a selected one of said contacts.

Coiled springs 20 and 20' are disposed between the contact members 3, 3' and suitable recesses provided therefor in the opposite wall portion of block 1, as shown in Figure 6, biasing the contact members 3 and 3' outwardly toward the plate member 8.

Block member 1 is formed with an additional recess 6 between the recesses 2 and 2' in which is positioned a contact member 7 formed with a contacting projection 90 which is substantially aligned with the projections 84, 85, 87 and 88, and which is therefore engageable with one of the contacts 76, 77 or 78, depending upon the position of the block member 1 in the sleeve-like housing 10.

Contact member 7 is provided with an axially extending rod-like projection 92 of conductive material, which may, for example, be formed integrally with the conductive contact member 7, the rod-like element 92 extending slidably through an aperture 93 in block member 1 which communicates with a recess 16 formed in the surface portion of block 1 adjacent the insulating plate 15. A coiled spring 21 surrounds the rod-like member 93, bearing between member 7 and the inner wall surface of recess 6, biasing member 7 toward the plate member 8 so that projection 90 engages said plate member and a selected one of the contacts 76, 77 or 78, as will be presently described.

Secured to the plate member 15 in the recess 16 is a U-shaped resilient contact strip 13 having a spring arm portion 94 which engages the end of the rod element 92.

As shown in Figure 5, the block member 1 is formed adjacent the insulating plate 15 with an additional recess 28 in which are secured a pair of U-shaped spring contact members 30 and 31 having the respective spring arm portions 95 and 96. The surface portion of block 1 adjacent the plate member 8 is formed with a recess 4 between and substantially in alignment with the projections 86 and 89, as shown in Figure 7, and movably mounted in said recess are the respective generally rectangular contact members 5 and 5'. The contact members 5 and 5' are in alignment with the row of contacts 79, 80 and 81. Contact member 5 is provided with a contact projection 99 adjacent one end thereof and with a contact projection 100 at its other end, said other end being adjacent the end of the contact member 5'. Said contact member 5' is formed with a contact projection 101 disposed opposite the projection 100 and being adapted to engage one of the contact elements 81, 80 or 79 simultaneously with the contact projection 100, as will be presently explained. The member 5' is formed at its opposite end with a contact projection 102 similar to the projection 99.

As will be seen from Figures 5 and 7, the contact projections 99 and 102 are generally hemispherical in shape, whereas the contact projections 100 and 101 are quarter-spherical in shape, together defining a generally hemispherical shape, but being spaced apart to render the contact elements 5 and 5' electrically independent of each other.

Formed on the contact member 5 is a rod-like projection 97 which extends through an aperture 24 in block 1 and which engages the spring contact arm 95 of the U-shaped contact spring 30 secured to plate member 15 in the recess 28. Formed on the contact element 5' is a rod-like member 98 which extends through an aperture 24' in the block 1 and engages the spring contact arm 96 of the U-shaped spring member 31 secured to insulating plate 15 in the recess 28. A coiled spring 103 surrounds the rod-like member 97 and bears between contact member 5 and a suitable seat formed in the recess 4 to receive same, biasing the contact member 5 outwardly toward the plate 8. A similar coiled spring 104 surrounds the rod-like member 98, bearing between contact member 5' and a suitable seat provided therefor in recess 4, as shown in Figure 5, biasing contact member 5' toward the plate member 8.

Designated at 35 is a stud member which is slidably mounted in the sleeve-like element 12, said stud member being formed with a circular flange 105 at its inner end received in a circular aperture 106 in insulating plate 15, whereby the flange cooperates with insulating plate 14 to prevent the removal of the stud 35. The inner end of stud 35 is formed with a rounded projection 107 and with a pin element 108 projecting axially from the rounded head 107. The pin element 108 engages in a central aperture 109 formed in a disc member 37 of insulating material. A coiled spring 110 is mounted in a recess 25 formed in block 1 and bears centrally on the disc member 37, biasing the stud member 35 outwardly. Peripherally secured on the disc member 37 is a contact ring 36 which is of sufficient diameter to simultaneously engage the arm portions of the U-shaped contact springs 30, 31 and 13 fastened to the insulating plate 15, said disc member 37 being located between the arms of the respective U-shaped spring members, as is clearly shown in Figure 5.

As will be readily apparent from Figure 4, when the stud member 35 is released so as to be moved outwardly by coiled spring 110, the ring member 36 connects together the respective spring contact members 13, 30 and 31, and thus connects together the respective contact elements 5, 5', and 7.

Rigidly secured to the ring member 48 on opposite sides of the sleeve-like stud element 12 are U-shaped abutment arms 44, 44 which are engageable with the sleeve-like stud element 12 to slide the block member 1 longitudinally in the housing 10 responsive to rotation of the ring member 48 either in one direction or the other, as the lever member 43 is moved in the slot 52. Extending through the lever-clamping portion of ring member 48, shown at 112, and threadedly engaged through the lever member 43 in axial alignment with the stud element 35 is an abutment screw 41 which is adjusted to engage the end of the stud 35 and to retain said stud in a position wherein the conductive ring member 36 is held out of contact with respect to the spring arms 13, 31 and 30, when the lever member 43 is located in the longitudinal portion of the slot 52 as when the lever 43 is employed to provide a normal turn signal. The screw 41 is adjusted so that when the lever member 43 is opposite the notched portion 51, namely, is in a neutral position, a reasonable force exerted on the end of the lever 43 will cause ring member 48 and collar member 45 to yield sufficiently to allow the end of the screw 41 to disengage from the end of stud 35 sufficiently to allow ring 36 to engage the fixed arms of the U-shaped contact members 13, 30 and 31.

A lock nut 42 is provided on screw 41 for securing the screw in its adjusted position, as shown in Figures 2 and 3.

Stationary contact element 77 is connected to the ungrounded terminal of the vehicle battery, as by a wire 113. Stationary contact element 78 is connected, as by a wire 114, to the ungrounded terminal of the left front direction signal lamp. Stationary contact 76 is connected as by a wire 115 to the ungrounded terminal of the right front direction signal lamp. Stationary contact element 79 is connected, as by a wire 116 to the ungrounded terminal of the left rear direction signal lamp and stationary contact 81 is connected as by a wire 117 to the ungrounded terminal of the right rear direction signal lamp. Therefore, as illustrated in Figure 9, when the lever 43 is actuated to signal for a left turn, the ring member 48 is rotated to move contact member 3 into engagement with the stationary contact elements 77, 78 and 81. This connects the ungrounded terminal of the left rear lamp to the ungrounded terminal of the battery and the ungrounded terminal of the left front lamp to the ungrounded terminal of the battery through the conductive contact member 3. Similarly, as shown in Figure 10, when the lever 43 is actuated to rotate collar member 48 in the opposite direction to signal for a right turn, contact element 3' connects stationary contact 79 and 76 to the stationary battery contact 77. Under normal conditions, as shown in Figure 11, none of the ungrounded lamp contacts are connected to battery terminal 77.

As above explained, when the direction signal device is in its caution light "on" position shown in Figure 1, with the lever member 43 engaged in the notch 51 by a maintained force, a warning indication may be provided by exerting sufficient force on lever 43 to disengage the end of screw 41 from stud 35, allowing the ring 36 to interconnect the spring contacts 13, 30 and 31. As shown in Figure 12, this connects battery contact 77 with the left rear lamp contact 81 and the right rear contact 79, thus energizing both of the rear lamps of the vehicle and providing characteristic operation of said rear lamps, namely, blinking indications of the rear lamps, as would be otherwise obtained when direction signals are given, serving as a signal to drivers of rearward vehicles which may notify such drivers of an impending deceleration of the signalling vehicle prior to the actual application of the brakes of the vehicle.

From the above description, it is readily apparent that by the use of the device of the present invention it is possible to provide a caution signal, namely, to energize both of the rear direction signal lamps of a vehicle simultaneously, by merely exerting an appropriate force on the direction signal operating lever 43, with the lever in the position of Figure 1, sufficient to release the stud element 35. This will energize the rear lamps in a characteristic manner, similar to the type of energization provided when giving a direction signal, namely, by flashing the lamps, which will serve as a caution warning to drivers of rearward vehicles, and which will notify such drivers that the signalling vehicle is about to decelerate.

While a specific embodiment of an improved combination direction signal and warning switch device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a control switch, a sleeve-like housing having an insulating base plate, two rows of spaced contacts mounted on said base plate, one of said rows comprising a central contact and respective primary contacts on opposite sides of said central contact, the other row comprising a pair of spaced secondary contacts, a block member slidably mounted in said housing and having a pair of substantially triangular bridging conductors engaging said base plate, said bridging conductors being formed and arranged so that in one position of the block member one of said conductors connects a primary contact and a secondary contact to said central contact, in another position of said block member the other conductor connects the remaining primary contact and secondary contact to said central contact, and in an intermediate position disconnects said central contact from the primary and secondary contacts, said bridging conductors being formed and arranged to maintain engagement with the secondary contacts in said intermediate position of the block member, a further conductor mounted in the block member and being formed and arranged to engage said central contact in said intermediate position of the block member, respective conductive elements mounted in the block member and being electrically connected to said conductors, a stud element slidably mounted in the block member for axial movement between said conductive elements and projecting externally of the housing, and a conductor operatively associated with said stud elements and being arranged to bridgingly electrically connect said conductive elements together responsive to axial movement of said stud elements, whereby said secondary contacts will be connected to said central contact responsive to said axial movement when the block member is in said intermediate position.

2. In a control switch, a movable lever, a sleeve-like housing mounted on the vehicle adjacent said lever, said housing having an insulating base plate, two rows of spaced contacts mounted in said base plate, one of said rows comprising a central contact and respective primary contacts on opposite sides of said central contact, the other row comprising a pair of spaced secondary contacts, a block member slidably mounted in said housing and having a pair of substantially triangular bridging conductors engaging said base plate, said bridging conductors being formed and arranged so that in one position of the block member one of said conductors connects a primary contact and a secondary contact to said central contact, in another position of said block member the other conductor connects the remaining primary contact and secondary contact to said central contact, and in an intermediate position disconnects said central contact from the primary and secondary contacts, said bridging conductors being formed and arranged to maintain engagement with the secondary contacts in said intermediate position of the block member, a further conductor mounted in the block member and being formed and arranged to engage said central contact in said intermediate position of the block member, respective conductive elements mounted in the block member and being electrically connected to said conductors, a stud element slidably mounted in the block member for axial movement between said conductor elements and projecting externally of the housing, a conductor operatively associated with said stud element and being arranged to bridgingly electrically connect said conductive elements together responsive to axial movement of said stud element, whereby said secondary contacts will be connected to said central contact responsive to said axial movement when the block member is in said intermediate position, means slidably moving said block member in said housing responsive to movement of said lever in one direction, and means moving said stud element axially responsive to movement of the lever in another direction.

3. In a control switch assembly, a movable lever mounted on said assembly, a sleeve-like housing mounted on the assembly adjacent said lever, said housing having an insulating base plate, two rows of spaced contacts mounted in said base plate, one of said rows comprising a central contact and respective primary contacts on opposite sides of said central contact the other row comprising a pair of spaced secondary contacts, a block member slidably mounted in said housing and having a pair of substantially triangular bridging conductors engaging said base plate, said bridging conductors being formed and arranged so that in one position of the block member one of said conductors connects a primary contact and a secondary contact to said central contact, in another position of said block member the other conductor connects the remaining primary contact and secondary contact to said central contact, and in an intermediate position disconnects said central contact from the primary and secondary contacts, said bridging conductors being formed and arranged to maintain engagement with the secondary contacts in said intermediate position of the block member, a further conductor mounted in the block member and being formed and arranged to engage said central contact in said intermediate position of the block member, respective conductive elements mounted in the block member and being electrically connected to said conductors, a stud element slidably mounted in the block member for axial movement between said conductive elements and projecting externally of the housing, a conductor operatively associated with said stud element and being arranged to bridgingly electrically connect said conductive elements together responsive to axial movement of said stud element, whereby said secondary contacts will be connected to said central contact responsive to said axial movement when the block member is in said intermediate position, means slidably moving said block member in said housing responsive to movement of said lever in one direction, and means moving said stud element axially responsive to movement of the lever in another direction.

4. In a control switch, a sleeve-like housing having an insulating base plate, two rows of spaced contacts mounted in said base plate, one of said rows comprising a central contact and respective primary contacts on opposite sides of said central contact, the other row comprising a pair of spaced secondary contacts, a block member slidably mounted in said housing and having a pair of substantially triangular bridging conductors engaging said base plate, said bridging conductors being formed and arranged so that in one position of the block member, one of said conductors connects a primary contact and a secondary contact to said central contact, in another position of said block member the other conductor connects the remaining primary contact and secondary contact to said central contact, and in an intermediate position disconnects said central contact from the primary and secondary contacts, said bridging conductors being formed and arranged to maintain engagement with the secondary contacts in said intermediate position of the block member, a further conductor mounted in the block member and being formed and arranged to engage said central contact in said intermediate position of the block member, respective conductive elements mounted in the block member and being electrically connected to said conductors, a stud element slidably mounted in the block member for axial movement between said conductive elements and projecting externally of the housing, a conductive ring member movably mounted in the block member adjacent said conductive elements and being at times axially movable into simultaneous conductive engagement with said conductive elements, and means operatively coupling said ring member to said stud element for simultaneous axial movement therewith to bridgingly electrically connect said conductive elements together responsive to axial movement of said stud element, whereby said secondary contacts will be connected to said central contact responsive to said axial movement when the block member is in said intermediate position.

5. In a control switch assembly, a movable lever mounted on said assembly, a sleeve-like housing mounted on said assembly adjacent said lever, said housing having an insulating base plate, two rows of spaced contacts mounted in said base plate, one of said rows comprising a central contact and respective primary contacts on opposite sides of said central contact, the other row comprising a pair of spaced secondary contacts, a block member slidably mounted in said housing and having a pair of substantially triangular bridging conductors engaging said base plate, said bridging conductors being formed and arranged so that in one position of the block member one of said conductors connects a primary contact and a secondary contact to said central contact and in another position of said block member the other conductor connects the remaining primary contact and secondary contact to said central contact, and in an intermediate position disconnects said central contact from the primary and secondary contacts, said bridging conductors being formed and arranged to maintain engagement with the secondary contacts in said intermediate position of the block member, a further conductor mounted in the block member and being formed and arranged to engage said central contact in said intermediate position of the block member, respective conductive elements mounted in the block member and being electrically connected to said conductors, a stud element slidably mounted in the block member for axial movement between said conductive elements and projecting externally of the housing, a conductive ring member movably mounted in the block member adjacent said conductive elements and being at times axially movable into simultaneous conductive engagement with said conductive elements, means operatively coupling said ring member to said stud element for simultaneous axial movement therewith to bridgingly electrically connect said conductive elements together responsive to axial movement of said stud element, whereby said secondary contacts will be connected to said central contact responsive to said axial movement when the block member is in said intermediate position, means slidably moving said block member in said housing responsive to movement of said lever in one direction, and means moving said stud element axially responsive to movement of the lever perpendicular to said one direction.

References Cited in the file of this patent

UNITED STATES PATENTS

| | | |
|---|---|---|
| 2,602,849 | Lawson et al. | July 8, 1952 |
| 2,656,426 | Dibelka | Oct. 20, 1953 |
| 2,667,627 | Hollins | Jan. 26, 1954 |
| 2,672,531 | Stevenson | Mar. 16, 1954 |
| 2,706,807 | Hollins | Apr. 19, 1955 |